(12) United States Patent
Chang et al.

(10) Patent No.: US 7,840,516 B2
(45) Date of Patent: *Nov. 23, 2010

(54) PRESERVING PRIVACY OF ONE-DIMENSIONAL DATA STREAMS BY PERTURBING DATA WITH NOISE AND USING DYNAMIC AUTOCORRELATION

(75) Inventors: Yuan-Chi Chang, New York, NY (US); Feifei Li, Boston, MA (US); Spyridon Papadimitriou, White Plains, NY (US); George A. Mihaila, Yorktown Heights, NY (US); Ioana Stanoi, San Jose, CA (US); Jimeng Sun, Pittsburgh, PA (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/678,808

(22) Filed: Feb. 26, 2007

(65) Prior Publication Data

US 2008/0205641 A1   Aug. 28, 2008

(51) Int. Cl.
 *G06F 17/00* (2006.01)
(52) U.S. Cl. .................................................. 706/47
(58) Field of Classification Search .............. 707/1, 707/101, 102, 758; 380/28, 200, 201, 220, 380/255, 268; 713/168; 726/26–30, 22; 706/45–47; 708/300
See application file for complete search history.

(56) References Cited

U.S. PATENT DOCUMENTS

| 6,327,574 | B1 | 12/2001 | Kramer et al. |
| 6,546,389 | B1 | 4/2003 | Agrawal et al. |
| 6,694,303 | B1 | 2/2004 | Agrawal et al. |
| 6,834,272 | B1 | 12/2004 | Naor et al. |
| 6,931,403 | B1 | 8/2005 | Agrawal et al. |
| 7,024,409 | B2 | 4/2006 | Iyengar |
| 7,107,269 | B2 | 9/2006 | Arlein et al. |
| 7,302,420 | B2 * | 11/2007 | Aggarwal et al. ............... 707/1 |
| 2005/0049991 | A1 * | 3/2005 | Aggarwal et al. ............... 707/1 |
| 2008/0025511 | A1 * | 1/2008 | Fuse et al. .................. 380/256 |
| 2008/0140425 | A1 * | 6/2008 | Shimada .................... 704/500 |
| 2010/0033305 | A1 * | 2/2010 | Korgaonkar et al. ....... 340/10.1 |

OTHER PUBLICATIONS

Papadimitriou et al. Time Series Compressibility and Privacy, Sep. 2007, ACM VLDB '07, pp. 459-470.*

(Continued)

*Primary Examiner*—David R Vincent
(74) *Attorney, Agent, or Firm*—Jon A. Gibbons; Fleit Gibbons Gutman Bongini & Bianco PL

(57) ABSTRACT

A method, information processing system, and computer readable medium are provided for preserving privacy of one-dimensional nonstationary data streams. The method includes receiving a one-dimensional nonstationary data stream. A set of first-moment statistical values are calculated, for a given instant of sub-space of time, for the data. The first moment statistical values include a principal component for the sub-space of time. The data is perturbed with noise along the principal component in proportion to the first-moment of statistical values so that at least part of a set of second-moment statistical values for the data is perturbed by the noise only within a predetermined variance.

19 Claims, 9 Drawing Sheets

OTHER PUBLICATIONS

Li et al.,Hiding in the Crowd: Privacy Preservation on Evolving Streams through Correlation Tracking, ICDE Conference, 2007—Citeseer, pp. 1-10.*

Kargupta et al. On the Privacy Preserving Properties of Random Data Perturbation Techniques, ICDM 2003 Citeseer pp. 1-8, retrieved from <http://portal.acm.org/citation.cfm?id=951949.952160> on Feb. 27, 2010.*

Ghil, M. et al., "Advanced Spectral Methods for Climatic Time Series", *Rev. of Geophys*, 40(1) 2002, pp. 1-1-1-41.

Machanavajjhala, Ashwin, et al, "l-Diversity: Privacy Beyond $k$-Anonymity", Department of Computer Science, Cornell University, pp. 1-12, In *ICDE*, 2006.

Kargupta, Hillol et al, "On the Privacy Preserving Properties of Random Data Perturbation Techniques", In *ICDM*, 2003.

Chen, Keke, "Privacy Preserving Data Classification with Rotation Perturbation", College of Computing, Georgia Institute of Technology, pp. 1-4, In *ICDM*, 2005.

Evfimievski, Alesandre, et al., "Privacy Preserving Mining of Association Rules", IBM Almaden Research Center, *SIGKDD* 2002 Edmonton, Alberta, Canada.

Du, Wenliang, et al., "Using Randomized Response Techniques for Privacy-Preserving Data Mining", pp. 1-6, SIGKDD '03, Aug. 24-27, 2003, Washington, DC USA.

Agrawal, Dakshi, et al., "On the Design and Quantification of Privacy Preserving Data Mining Algorithms", In *PODS*, 2001, IBM T.J. Watson Research Center, Yorktown Heights, NY 10598.

Evfimievski, Alexandre, et al., "Limiting Privacy Breaches in Privacy Preserving Data Mining", *PODS* 2003, Jun. 9-12, 2003, San Diego, CA.

Agrawal, Rakesh, et al., "Privacy-Preserving Data Mining", pp. 439-450, ACM SIGMOD 2000 5/00 Dallas, TX, USA.

Huang, Zhengli, et al., "Deriving Private Information from Randomized Data", pp. 37-48, *SIGMOD* 2005 Jun. 14-16, 2005, Baltimore, Maryland, USA.

Papadimitriou, Spiros, et al., "Optimal Multi-scale Pattersn in Time Series Streams", *SIGMOD 2006*, Jun. 27-29, 2006, Chicago, Illinois, USA.

Kifer, et al, "Injecting Utility into Anonymized Datasets", *SIGMOD 2006*, Jun. 27-29, 2006, Chicago, Illinois, USA.

Sweeney, Latanya, "$k$-Anonymity: A Model for Protecting Privacy", *International Journal on Uncertainty, Fuzziness aand Knowledge-based Systems*, 10 (5), 2002; 557-570.

Liu, Kun, et al., "Random Projection-Based Multiplicative Data Perturbation for Privacy Preserving Distributed Data Mining", IEEE Transactions on Knowledge and Data Engineering, pp. 92-106, vol. 18, No. 1, Jan. 2006, published by IEEE Computer Society online Nov. 18, 2005.

Zhu, Yunyue, et al., "StatStream: Statistical Monitoring of Thousands of Data Streams in Real Time", Proceedings of the $28^{th}$ VLDG Conference, Hong Kong, China, 2002.

Papadimitriou, Spiros, et al., "Streaming Pattern Discovery in Multiple Time-Series", pp. 697-708, Proceedings of the $31^{st}$ VLDG Conference, Trondheim, Norway, 2005.

Non-Final Office Action dated Mar. 9, 2010, U.S. Appl. No. 11/678,7868.

* cited by examiner iid noise

PRESERVING PRIVACY OF ONE-DIMENSIONAL DATA STREAMS BY PERTURBING DATA WITH NOISE AND USING DYNAMIC AUTOCORRELATION

CROSS REFERENCE TO RELATED APPLICATION

This application is related to the inventor's application "Preserving Privacy of Data Streams Using Dynamic Correlations", Ser. No. 11/678,786, which was filed on the same day as the present application and commonly assigned herewith to International Business Machines Corporation. This related application is incorporated herein by reference in its entirety.

FIELD OF THE INVENTION

The present invention generally relates to the field of data stream publishing, and more particularly relates to preserving privacy in data streams.

BACKGROUND OF THE INVENTION

Recently, there has been an increasing concern regarding privacy breaches, especially those involving sensitive personal data of individuals as discussed in A. Evfimevski, J. Gehrke, and R. Srikant. Limiting privacy breaches in privacy preserving data mining. In *PODS*, 2003, which is hereby incorporated by reference in its entirety. As a result, restrictions and regulations in publishing sensitive personal data have been tightened as discussed in K. Thearling. Data mining and privacy: A conflict in making. In *DS\**, 1998; which is hereby incorporated by reference in its entirety; these address data owned by government organizations as well as corporations. It is therefore not surprising that the data management community has become increasingly focused on ways to guarantee the privacy of sensitive data.

Meanwhile, unprecedented massive data from various sources provide a great opportunity for data mining and information integration. Unfortunately, the privacy requirement and data mining applications pose exactly opposite expectations from data publishing as discussed in A. Evfimevski, J. Gehrke, and R. Srikant. Limiting privacy breaches in privacy preserving data mining. In *PODS*, 2003, K. Thearling. Data mining and privacy: A conflict in making. In *DS\**, 1998, which are hereby incorporated by reference in their entirety. The utility of the published data with respect to the mining application decreases with increasing levels of privacy guarantees as discussed in D. Kifer, and J. Gehrke. Injecting utility into anonymized datasets. In *SIGMOD*, 2006, which is hereby incorporated by reference in its entirety. Previous work has noticed this important tradeoff between privacy and utility and various techniques have been proposed to achieve a desired balance between the two as discussed in R. Agrawal and R. Srikant. Privacy preserving data mining. In *SIGMOD*, 2000, H. Kargupta, S. Datta, Q. Wang, and K. Sivakumar. On the privacy preserving properties of random data perturbation techniques. In *ICDM*, 2003, K. Liu, H. Kargupta, and J. Ryan. Random Projection-Based Multiplicative Data Perturbation for Privacy Preserving Distributed Data Mining. *IEEE TKDE*, 18(1), 2006, K. Chen and L. Liu. Privacy preserving data classification with rotation perturbation. In *ICDM*, 2005, W. Du and Z. Zhan. Using randomized response techniques for privacy-preserving data mining. In *SIGKDD*, 2003, A. Machanavajjhala, J. Gehrke, D. Kifer, and M. Venkitasubramaniam. I-diversity: Privacy beyond k-anonymity. In *ICDE*, 2006, L. Sweeney. k-anonymity: a model for protecting privacy. *Int. J Uncertain. Fuzziness Knowl.-Based Syst.*, 10(5), 2002., A. Evfimevski, R. Srikant, R. Agarwal, and J. Gehrke. Privacy preserving mining of association rules. In *SIGKDD*, 2002, which are hereby incorporated by reference in their entirety.

Prior related work such as that described in R. Agrawal and R. Srikant. Privacy preserving data mining. In *SIGMOD*, 2000, D. Agrawal and C. C. Aggarwal. On the design and quantification of privacy preserving data mining algorithms. In *PODS*, 2001, H. Kargupta, S. Datta, Q. Wang, and K. Sivakumar. On the privacy preserving properties of random data perturbation techniques. In *ICDM*, 2003, Z. Huang, W. Du, and B. Chen. Deriving private information from randomized data. In *SIGMOD*, 2005, which are hereby incorporated by reference in their entirety, includes additive random perturbation for the offline, conventional relational data model, where the noise is distributed along the principal components of the original data in order to achieve maximum privacy, given a fixed utility. These offline algorithms are not optimal when applied to numerical, nonstationary (or, time-evolving) data streams. The dynamic correlations and autocorrelations, if not carefully considered, may allow for the reconstruction of the original streams. Other problems are that in random perturbation systems, analysis of the data has to be performed incrementally, using limited processing time and buffer space, making batch approaches unsuitable. Second, the characteristics of streams evolve over time. Consequently, approaches based on global analysis of the data are not adequate.

Therefore a need exists to overcome the problems with the prior art as discussed above.

SUMMARY OF THE INVENTION

Briefly, in accordance with the present invention, disclosed are a method, information processing system, and a computer readable medium for preserving privacy of one-dimensional nonstationary data streams. The method includes receiving a one-dimensional nonstationary data stream. A set of first-moment statistical values are calculated, for a given instant of sub-space of time, for the data. The first moment statistical values include a principal component for the sub-space of time. The data is perturbed with noise along the principal component in proportion to the first-moment of statistical values so that at least part of a set of second-moment statistical values for the data is perturbed by the noise only within a predetermined variance.

In another embodiment, an information processing system for preserving privacy of one-dimensional nonstationary data streams is disclosed. The information processing system includes a memory and a processor that is communicatively coupled to the memory. The information processing system also includes a privacy preserving module. The privacy preserving module is adapted to receiving a one-dimensional nonstationary data stream. A set of first-moment statistical values are calculated, for a given instant of sub-space of time, for the data. The first moment statistical values include a principal component for the sub-space of time. The data is perturbed with noise along the principal component in proportion to the first-moment of statistical values so that at least part of a set of second-moment statistical values for the data is perturbed by the noise only within a predetermined variance.

In yet another embodiment, a computer readable medium for preserving privacy of one-dimensional nonstationary data streams is disclosed. The computer readable medium comprises instructions for receiving a one-dimensional nonstationary data stream. A set of first-moment statistical values are calculated, for a given instant of sub-space of time, for the data. The first moment statistical values include a principal component for the sub-space of time. The data is perturbed with noise along the principal component in proportion to the first-moment of statistical values so that at least part of a set of second-moment statistical values for the data is perturbed by the noise only within a predetermined variance.

One advantage of the present invention is that privacy within data streams is provided. The present invention efficiently and effectively tracks the correlation and autocorrelation structures of multivariate streams and leverages it to add noise, which maximally preserves privacy. The present invention provides efficient online streaming algorithms that guarantee the privacy of single or multiple nonstationary data streams. Random perturbations can be inserted in the data stream that "mirror" the streams' statistical properties, in an online fashion. A number of important mining operations can still be performed, by controlling perturbation magnitude. However, the original data streams cannot be reconstructed with high confidence. In other words, the present invention provides a privacy preserving method under the additive random perturbation framework that maximally preserves the privacy of data streams given a fixed utility while, additionally, better preserving the statistical properties of the data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
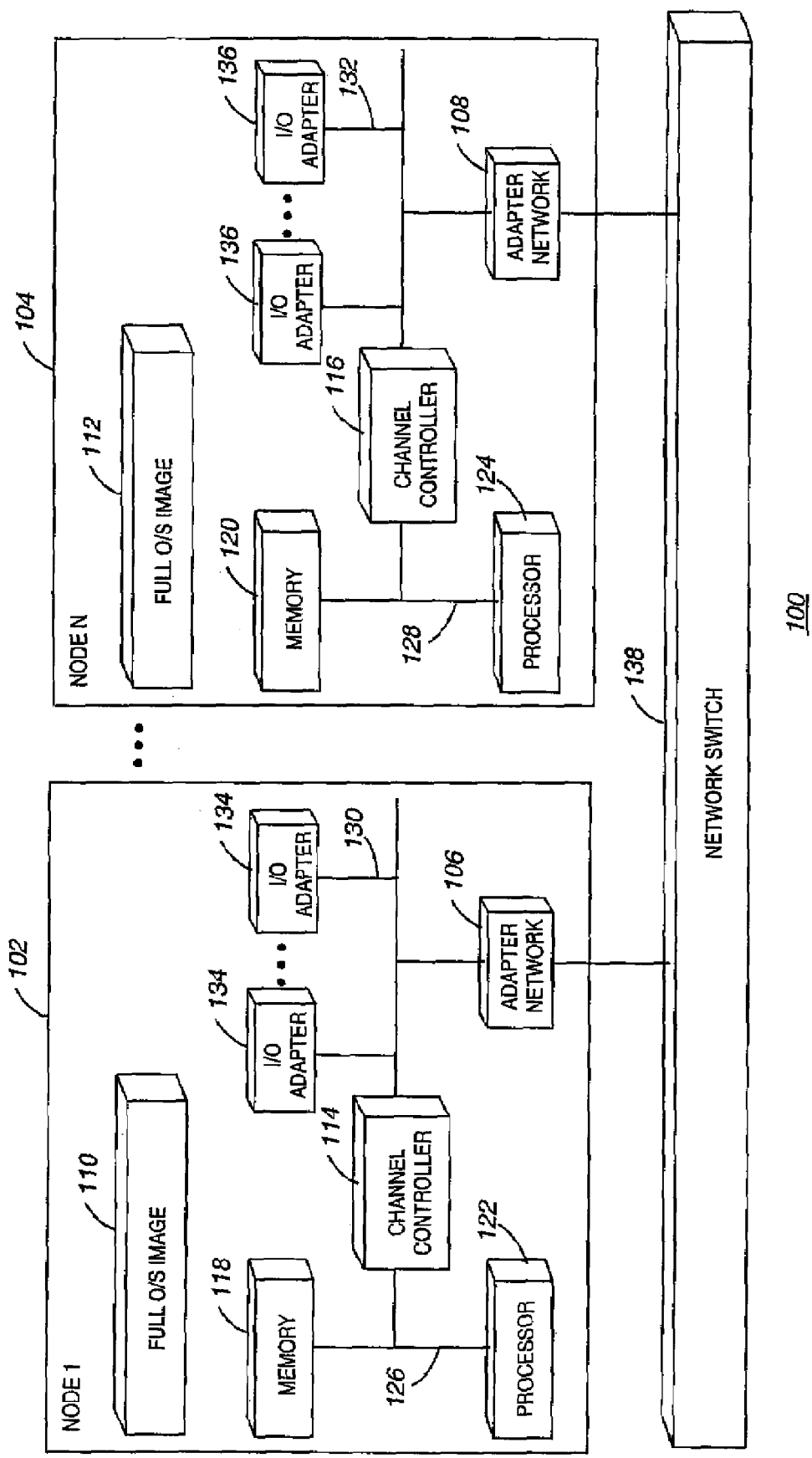
FIG. 1 is a block diagram illustrating an exemplary computing environment, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include nonvolatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions durring a memory copy operation thereby avoiding unnecessary processor downtime.

Exemplary Computing Environment

FIG. 1 is a block diagram illustrating an exemplary computing environment according to an embodiment of the present invention. In one embodiment, the computing environment 100 of FIG. 1 is used for data stream processing. A stream processing system, in one example, is an information processing system based on a network of processing elements, where processing elements are software programs and where the entities that are processed by the processing elements comprise data objects (for example, documents represented in digital form). It should be noted that a stream processing system can include the privacy preserving module of the present invention or the stream processing system can be communicatively coupled to an information processing system comprising the privacy preserving module.

In the illustrated embodiment, the computing environment 100 is a distributed system in a symmetric multiprocessing ("SMP") computing environment. The computing environment 100 includes processing nodes 102 and 104 coupled to one another via network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 120 and 122 couples I/O adapters 134 and 136 and network adapter 106 and 108. Although only one processor 122 and 124 is shown in each processing node 102 and 104, each processing node 102 and 104 is capable of having more than one processor. Each network adapter is linked together via a network switch 132. In some embodiments, the various processing nodes 102 and 104 are part of a processing cluster.

Stream Processing System

Figure 2:
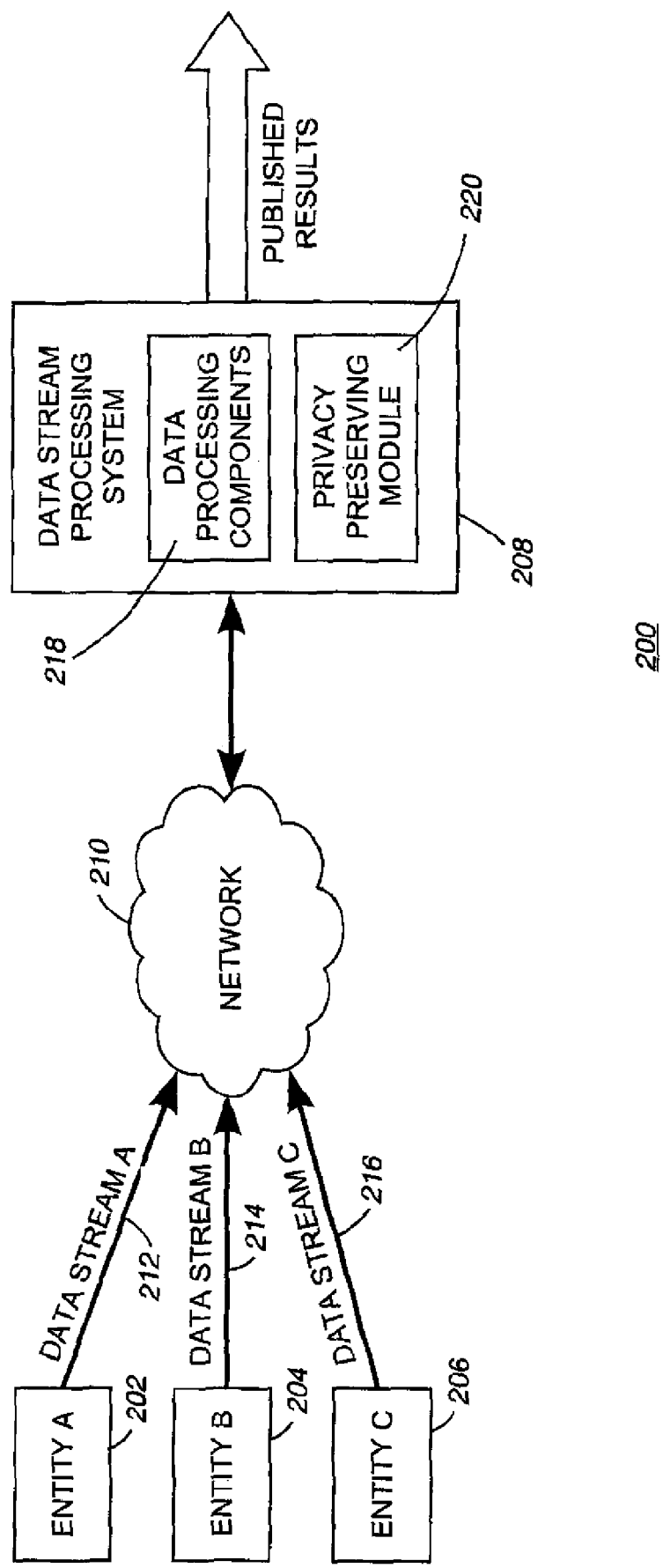
FIG. 2 is a block diagram illustrating and exemplary data stream processing system environment according to an embodiment of the present invention.

FIG. 2 illustrates an exemplary data stream processing system environment 200. A stream processing system 208 in the data stream processing system environment 200 receives various inputs streams and performs operations on those streams. For example, a stream processing system 208 may perform data mining and information integration on the received streams. FIG. 2 shows a plurality of entities, Entity A 202, Entity B 204, and Entity C, 206. These entities can be any business, government, individual, or the like that wants to provide data to a stream processing system 208. Each entity 202, 204, 206 is communicatively coupled to a stream processing system 200 via a network 210 such as the Internet, local area network, or the like.

Each entity 202, 204, 206 provides one or more data streams 212, 214, 216 to the stream processing system 208. Data stream processing components 218 within the stream processing system 208 perform the requested functions such as analytical services, identification of trends, clusters, patterns, aggregations', and the like. The results of the stream processing system 208 can then be published. However, the data in the data streams 212, 214, 216 can be private or sensitive. Therefore, publishing the results the stream processing system associated with private or sensitive information can be problematic. Many businesses and corporations do not want to publish their original data streams. Therefore, the stream processing system 208 includes a privacy preserving module 220, which allows results to be published while maintaining the privacy of the data. The privacy preserving functions of the privacy preserving module 220 are discussed in greater detail in the following sections.

In one embodiment, the stream processing system 208 receives multiple continuous streams as discussed above. A stream is a time ordered sequence of tuples. Without loss of generality, it can be assumed that each tuple comprises of a single attribute. However, a tuple is only referred as having a single attribute for clarity and multi-attribute tuples can be handled in a manner similar to the case of multiple streams. Furthermore, it can be assumed that all streams are resampled to a common rate, which is between the arrival rate of the fastest and the slowest stream. The common sampling rate can be chosen based on arrival rate, data characteristics, and available processing capacity. Subsequently, any standard resampling technique such as those discussed in A. V. Oppenheim and A. S. Wilsky. *Signals and Systems*. Prentice-Hall, 1983, S. Haykin. *Adaptive Filter Theory*. Prentice-Hall, 4th edition, 2002. can be applied such as, for example, linear interpolation (for up-sampling) or decimated moving average (e.g., tumbling average, for down-sampling). In one embodiment, a time granularity is assumed such that, during each time interval, there is exactly one recorded incoming value from each stream.

Therefore, in one embodiment and without loss of generality, the data streams comprise of N data streams, denoted as $A^1, \ldots, A^N$. For any i-th data stream $A^i$, its value at time t is $A_j^i$. The stream collection is written as $A=[A^i$ for $1 \leq i \leq N]$. Formally, the stream collection A can be considered as a T×N matrix where N is the number of streams and T is the current timestamp, which grows indefinitely. The values from all streams at time t are $A_t \in R^N$, i.e., t-th row of A.

TABLE 1

Description of notation.

| Symbol | Description |
| --- | --- |
| v | a vector (lowercase bold) |
| v(i) | the i-th element of vector v |
| X | a matrix (uppercase bold) |
| $X^T$ | the transpose of X |
| $X_i$ or $X^j$ | i-th row or j-th column of X |
| $X_i^j$ | The entry (i, j) of X |
| T | the number of timestamps up to now |
| N | the number of streams |
| A | original stream collection in $R^{T \times N}$ |
| A* | the perturbed stream collection |
| Ã | the reconstructed stream collection |
| $A^n$ | the n-th stream |
| $A_t$ | the values from all streams at time t |
| E | the random noise in $R^{T \times N}$ |
| D(A, A*) | the discrepancy on original and perturbed streams |

Privacy Preservation Through Correlation Tracking

To ensure privacy of streaming data, the privacy preservation module 220 modifies the values of incoming tuples by adding noise. The random noise can be denoted as $E \in R^{T \times N}$, where each entry $E_t^i$ is the noise added to the i-th stream at time t. Therefore, the perturbed streams are $A^* = A+E$. Without loss of generality, in one embodiment, the noise is assumed to have zero mean to facilitate the discussion on utility and privacy the concept of decrepancy D between two versions of the data A and B is defined as the normalized squared Frobenius norm $$D(A, B) := \frac{1}{T}\|A - B\|_F^2,$$

where A, B $\in R^{T \times N}$. The squared Frobenius norm is defined as $\|A\|_F^2 := \Sigma_{i,j}(A_i^j)^2$.

With respect to utility, considering the perturbed versus the original data, the larger the amplitude of the perturbation (i.e., the variance of the added noise), the larger the distortion of the original values. However, as the distortion increases, the usefulness of the data decreases: a larger distortion hides the original values better but it also hides more information about their relationships. The discrepancy D(A,A*) between original and perturbed data measures precisely the squared distortion. The utility can be defined as the inverse of this discrepancy. However, throughout the discussion, discrepancy is typically used, since the two are essentially interchangeable.

With respect to privacy, distorting the original values is only part of the function performed by the privacy preserving module 220. The privacy preserving module 220 also ensures that that this distortion cannot be filtered out. Thus, to measure the privacy, the requirements to reconstruct the original data are considered. Specifically, suppose that $\tilde{A}$ are the reconstructed data streams obtained by an entity trying to reconstruct the original data. Then the privacy is the discrepancy between the original and the reconstructed streams, i.e., $D(A,\tilde{A})$.

Because an entity would obtain original data from the perturbed data, two problems are formulated, data reconstruction and data perturbation. Therefore, the privacy preserving module 220, given the perturbed streams A*, computes the reconstruction stream $\tilde{A}$ so that $D(A,\tilde{A})$ is minimized. This process is discussed in greater detail below. In one embodiment, linear reconstruction methods such as those described in H. Kargupta, S. Datta, Q. Wang, and K. Sivakumar. On the privacy preserving properties of random data perturbation techniques. In *ICDM*, 2003., Z. Huang, W. Du, and B. Chen. Deriving private information from randomized data. In *SIGMOD*, 2005., K. Liu, H. Kargupta, and J. Ryan. Random Projection-Based Multiplicative Data Perturbation for Privacy Preserving Distributed Data Mining. *IEEE TKDE*, 18(1), 2006., K. Chen and L. Liu. Privacy preserving data classification with rotation perturbation. In *ICDM*, 2005., are focused on by the present invention. Intuitively, an entity trying to obtain the original data can only user linear transformations on the perturbed data, such as projections and rotations, in the reconstruction step.

Linear construction can be defined as follows, given the perturbed streams A*, the linear reconstruction is $\tilde{A}=A*R$ such that $D(A,\tilde{A})$ is minimized. If both the perturbed streams A* and the original streams A are available, the solution $\tilde{A}$ can be easily identified using linear regression. However, A is not available. Therefore, in order to estimate $\tilde{A}$, some additional constraints or assumptions can be imposed to make the problem solvable. A widely adopted assumption described in 21 is that the data lie in a static low dimensional subspace (i.e., global correlation exists). This is reasonable, since if no correlations are present, then independent, identically distributed ("i.i.d.") perturbations are already sufficient to effectively hide the data. However, real data typically exhibit such correlations. In one embodiment, dynamic (rather than static) correlations among streams are relied upon, as well as on dynamic autocorrelations. This is discussed in greater detail below.

The privacy preservation module 220, given the original streams A and a desirable discrepancy threshold $\sigma^2$, also creates perturbed streams A* such that 1.) $D(A,\tilde{A})=\sigma^2$ and 2.) for any linear reconstruction $\tilde{A}, D(A,\tilde{A})>\sigma^2$. Perturbation has exactly the opposite goal from the reconstruction. However, the correlation and autocorrelation properties of the streams are still the keys in the solution to both problems as discussed in greater detail below.

Figure 3:
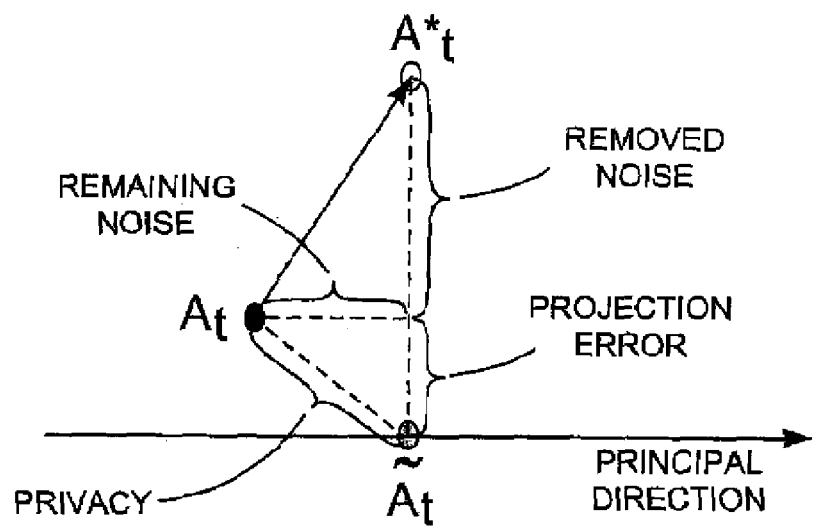
FIG. 3 is a graphical depiction for the perturbation and reconstruction of data.

One type of privacy preservation performed by the privacy preserving module 220 is privacy with dynamic correlation. With respect to the perturbation process, the privacy preserving module 220 maps the stream measurements $A_t$ at time t represented as an N-dimensional point to the perturbed measurements $A_t^*$ with discrepancy $\sigma^2$. For any reconstruction effort, the goal is to transform the perturbed measurements, $A_t^*$ onto $A_t$ so that, $D(A_t,\tilde{A}_t)$ is small. A principled way of reconstruction is to project the data onto the principal component subspace Z. Huang, W. Du, and B. Chen. Deriving private information from randomized data. In *SIGMOD*, 2005. such that most noise is removed, while the original data are maximally preserved, i.e., not much additional error is included. This illustrated in FIG. 3. When $A_t^*$ is projected onto the principal direction, the projection is exactly the reconstruction $\tilde{A}_t$. Note that the distance between $A_t^*$ and $\tilde{A}_t$ comprises two parts: 1.) removed noise, i.e., the perturbation that is removed by the reconstruction and 2.) projection error, i.e., the new error introduced by the reconstruction. Finally, the distance between $A_t$ and $\tilde{A}_t$, i.e., the privacy, comes from two sides: 1.) remaining noise, i.e., the perturbation noise that has not been removed, and 2.) projection error.

Figure 4:
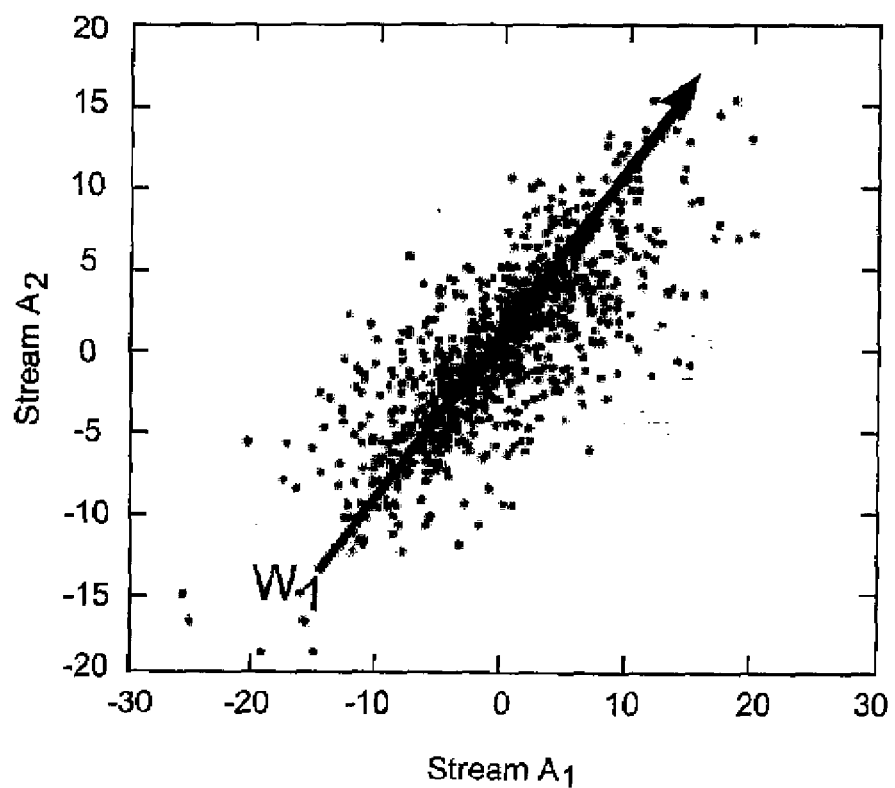
FIG. 4 is a graph showing an example of adding random noise to data.
Figure 5:
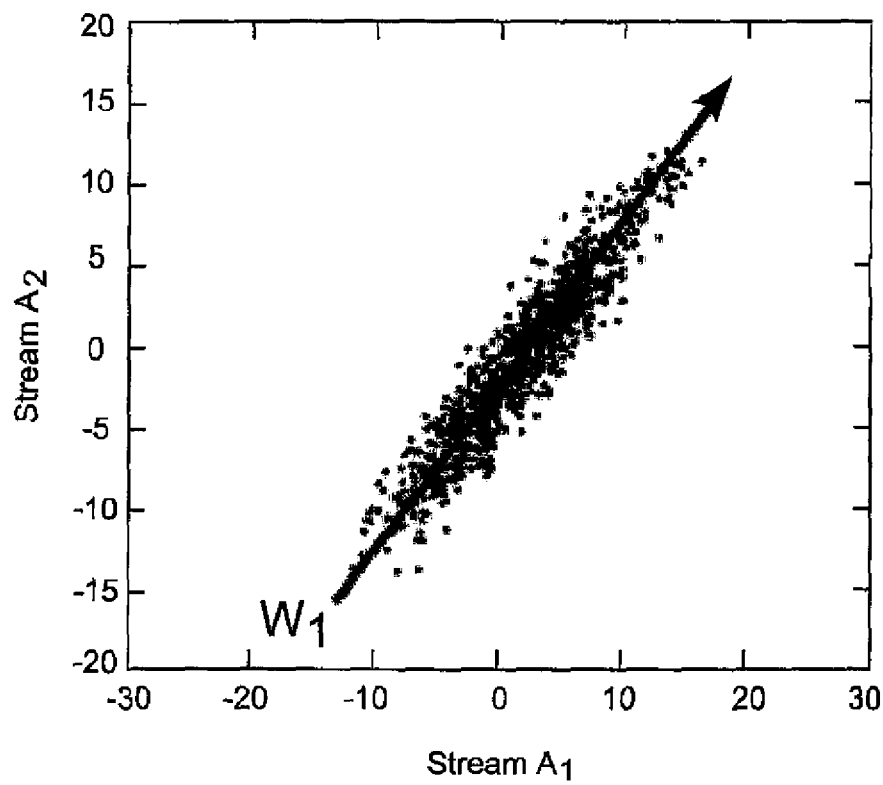
FIG. 5 is a graph showing an example of adding correlated noise to the same data in FIG. 4 according to an embodiment of the present invention.

When the noise is added exactly along the principal direction, removed noise becomes zero. However, additional projection error is included. In this case, the perturbation is robust towards this reconstruction attempt, in the sense that $D(A,\tilde{A})=D(A,A^*)$. In one embodiment, correlated noise is added following the trends present in the streams. Consider the example shown in FIGS. 4 and 5, where the dark points represent the original data and the lighter points represent the perturbed data with same amount of noise. FIG. 4 shows i.i.d. random noise on original data and FIG. 5 shows correlate noise as performed by the privacy preserving module 220 on the same original data. As can been seen, the correlated noise has been successfully "hidden" in the original data and, therefore, is hard to remove. The random noise shown in FIG. 4 can be easily averaged out by an entity to identify the original data.

The privacy preserving module 220 dynamically inserts noise using online correlating tracking. Once type of online correlating tracking is Streaming Correlated Additive Noise ("SCAN"). Table 2 shows one example of a SCAN algorithm.

TABLE 2

Algorithm 1: SCAN

Input:Original tuple $A_t$, utility threshold $\sigma^2$

Old subspace $U \in \mathbb{R}^{N \times k}$, $\Lambda \in \mathbb{R}k \times k$ Output:Perturbed tuple $A_t^*$, new subspace U, $\Lambda$ update eigenvector U, eigenvalue $\Lambda$ based on $A_t$)

Initialize $\delta$, $\eta$ to $\vec{0}_k$

// add noise in top-k principal component subspace for $1 \leq i \leq k$ do $$\begin{vmatrix} \delta(i) = \sigma^2 \times \frac{\Lambda(i)}{\|(\Lambda)\|} \\ \eta(i) = \text{gaussian noise with variance } \delta(i) \end{vmatrix}$$

// rotation back to the original space $E_t = \eta \times U^T$ and $A_t^* = A_t + E_t$ Data streams often present strong correlations and these correlations change dynamically Y. Zhu and D. Shasha. Statstream: Statistical monitoring of thousands of data streams in real time. In *VLDB*, 2002., S. Papadimitriou and P. Yu. Optimal multi-scale patterns in time series streams. In *SIGMOD*, 2006., S. Papadimitriou, J. Sun, and C. Faloutsos. Streaming pattern discovery in multiple time-series. In *VLDB*, 2005. Consider the examples in FIGS. 6 and 7, where the principal components are changing over time. In such case, online Principal Components Analysis ("PCA") is necessary to better characterize the evolving, local trends. Global, offline PCA fails to identify these important properties as we will show later in the experiments. SCAN does two things whenever new tuples arrive from the N input streams: 1.) update the estimation of local principal components; and 2.) distribute noise along the principal components in proportional to their Eigen values.

An important property of the SCAN algorithm is that when the noise is rotated back to the data space (line 6 of Table 2), its variance is equal to the specified discrepancy threshold $\sigma^2$. Intuitively, SCAN tracks the covariance matrix and adds noise with essentially the same covariance as the data streams. At any time instant T, the perturbed data streams A* from SCAN satisfy $D(A,A^*)=\sigma^2$. Additionally, SCAN preserves the eigenvectors of the (uncentered) covariance matrix of A. Therefore, the SCAN perturbation does not affect any mining algorithms that rely on the second moments of the data (i.e., linear correlations).

The privacy preserving module 220 can use Streaming Correlation Online Reconstruction ("SCOR"). Table 3 shows one example of a SCOR algorithm.

TABLE 3

Algorithm 2: SCOR

| | | |
|---|---|---|
| Input: | Perturbed tuple $A_t^*$, utility threshold $\sigma^2$ | |
| | Old subspace $U \in R^{N \times k}$, $\Lambda \in Rk \times k$ | |
| Output: | Perturbed tuple $\tilde{A}_t$, new subspace U, $\Lambda$ | |
| 1 | update eigenvector U. eigenvalue $\Lambda$ based on $A_t$ | |
| 2 | //project to the estimated online principal components | |
| | $\tilde{A}_t = A_t^* \times U_{N \times k} \times U_{N \times k}^T$ | |

Figure 6:
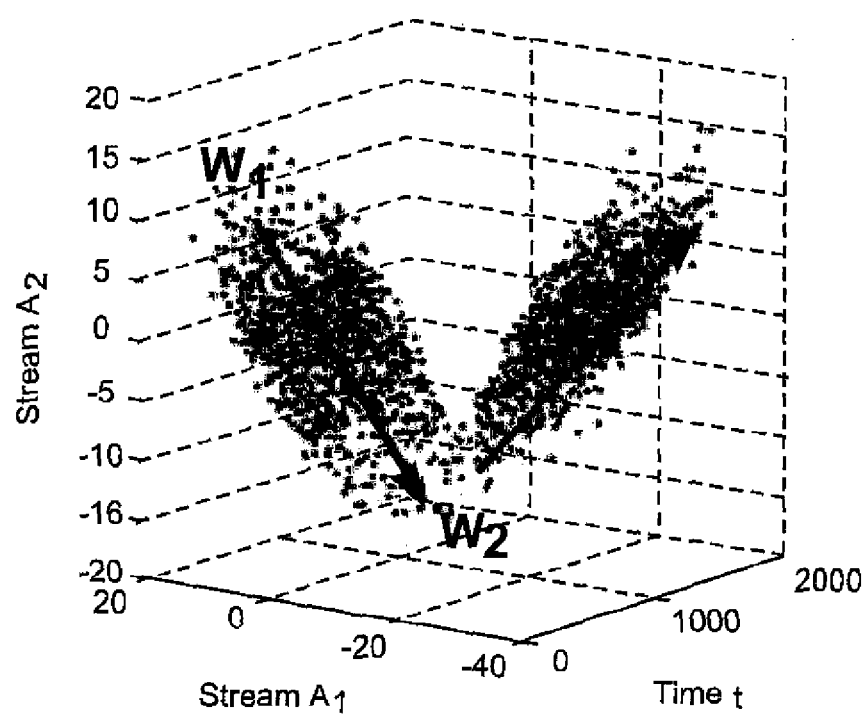
FIG. 6 is a graph showing an example of an evolving data stream.
Figure 7:
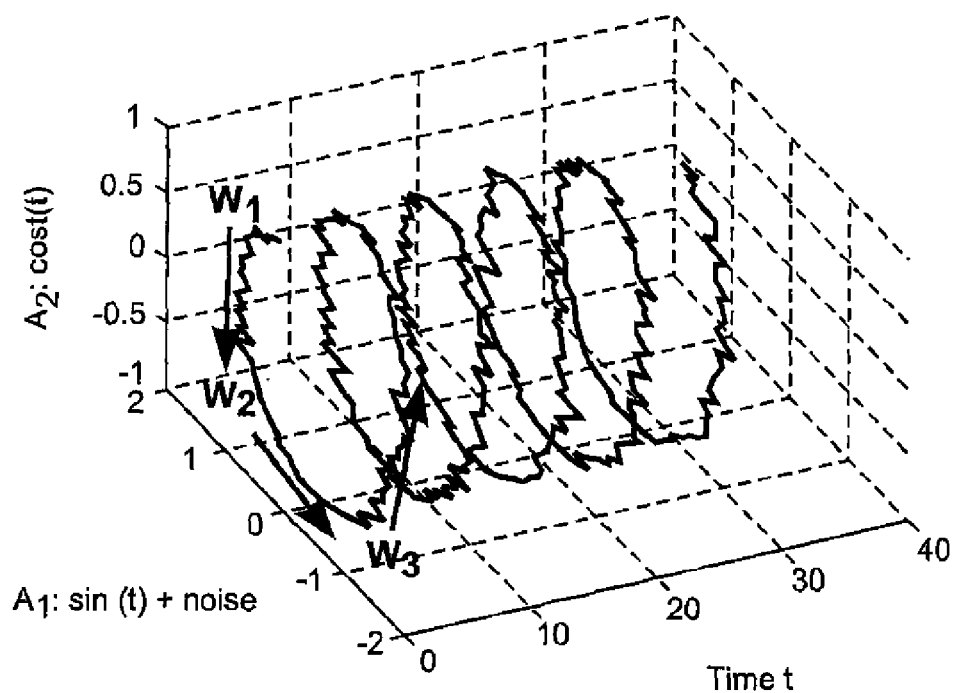
FIG. 7 is a graph showing another example of an evolving data stream.

The privacy achieved by SCAN is determined by the best linear reconstruction an adversary (an entity trying to obtain the original data from the perturbed data) could perform on A*. For evolving data streams as illustrated in FIGS. 6 and 7, the best choice for the entity is to utilize online estimation of local principal components for reconstruction. The ability to estimating the local principal components of the original data streams depends on how the noise has been added. For SCAN, the principal component directions are preserved, since the noise is added along their direction (discussed above). In general, it can be assumed the noise is small compared to the data, otherwise the utility of the perturbed data is too low to be useful. Then, tracking the principal components of the perturbed streams A* can give a good estimate of the principal components of the original streams A. Formally, $cov(A^*) \approx cov(A)$.

Intuitively, SCOR reconstruction removes all the noise orthogonal to the local principal components and inserts little additional projection error, since local PCA can usually track the data accurately. In other words, i.i.d. noise can usually be successfully removed, provided that the streams are correlated. However, the perturbation from SCAN cannot be removed at all since the noise is distributed along the "instantaneous" correlation in the streams. The reconstruction error of SCOR on the perturbation from SCAN is $\approx \sigma^2$. Formally, given a linear reconstruction $\tilde{A}=A^*R$, the privacy can be decomposed as $$D(A, \tilde{A}) = \|A - A*R\|_F^2$$
$$= \|A - (A + E)R\|_F^2$$
$$= \|A(I - R) + ER\|_F^2$$
$$= \left\|\underbrace{A(I - UU^T)}_{\text{projection error}} + \underbrace{EUU^T}_{\text{remaining error}}\right\|_F^2$$

where R is a projection matrix, meaning that $R=UU^T$ with $U \in R^{N \times k}$ orthonormal. Since the subspaces tracked by both SCOR and SCAN are the same, the remaining noise is $\sigma^2$, i.e., no noise is removed. Therefore, $D(A,\tilde{A}) \geq \sigma^2$ by the triangle inequality. Note that the projection error for SCOR is small, provided that the data are locally correlated. Therefore, the reconstruction error (i.e., privacy, as defined above) of SCOR is approximately $\sigma^2$, i.e., equal to the original discrepancy. Moreover, when $\sigma^2$ is small compared to the original data, other reconstruction methods result in higher error due to the large projection error.

Another type of privacy preservation performed by the privacy preserving module 220 is privacy with dynamic autocorrelation. The privacy preserving method discussed above was based on correlation across many streams. Dynamic autocorrelation is performed on a single stream. The noise added using dynamic autocorrelation mirrors the dominant trends in the series. Table 4 shows one example of a Streaming Autocorrelation Additive Noise Algorithm (SACAN) and Table 4 shows one example of a Streaming Auto-Correlation Online Reconstruction ("SACOR") algorithm.

TABLE 4

Algorithm 3: SACAN

| | | |
|---|---|---|
| Input: | Original value a*(t), utility $\sigma^2$ | |
| | Old subspace $U \in R^{h \times k}$, $\Lambda \in Rk \times k$ | |
| Output: | Perturbed value a*(t), new subspace U, $\Lambda$ | |
| 1 | Construct window $W_{t-h+1} = [a(t-h+1),...,a(t)]^T$ | |
| 2 | Update U, V using $W_{t-h+1}$ | |
| 3 | every k arriving values do | |
| 4 | $\|$ $[w_i^T \| w_r^T]^T = W_{t+h+1}$ | |
| 5 | $\|$ Solve equation 2 to obtain $e_r$ | |
| 6 | $\|$ Rescale $e_r$ based on $\sigma^2$ | |
| 7 | $\|$ Perturbed values $w_r^* = w_r + e_r$ | |
| 8 | $\|\_$ Publish values $a^*(t-k+i-1) = w_r^*(i), 1 \leq i \leq k$ | |

TABLE 5

Algorithm 4: SACOR

| | | |
|---|---|---|
| Input: | Perturbed value a*(t) | |
| | Old subspace $U \in R^{N \times k}$, $\Lambda \in Rk \times k$ | |
| Output: | Reconstruction $\tilde{a}(t)$, new subspace U, $\Lambda$ | |
| 1 Construct window $W_{t-h+1} = [a(t-h+1),...,a(t)]^T$ | | |
| 2 Update U, V using $W_{t-h+1}$ | | |
| 3 Project onto est. eigenspace $\tilde{W} = UU^T W_{t-h+1}$ | | |
| 4 Reconstruction is the last element of $\tilde{W}_t$, $\tilde{a}(t) = \tilde{W}_t^h$ | | |

Consider the following simple examples: If the stream always has a constant value, the right way to hide this value is to add the same noise throughout time. Any other noise can be easily filtered out by simple averaging. The situation is similar for a linear trend (this is also an example that cannot be captured by Fourier). If the stream is a sine wave, the right way to hide it is by adding noise with the same frequency (but potentially a different phase); anything else can be filtered out. Dynamic autocorrelation is the generalization, in a principled manner, of these notions.

Figure 8:
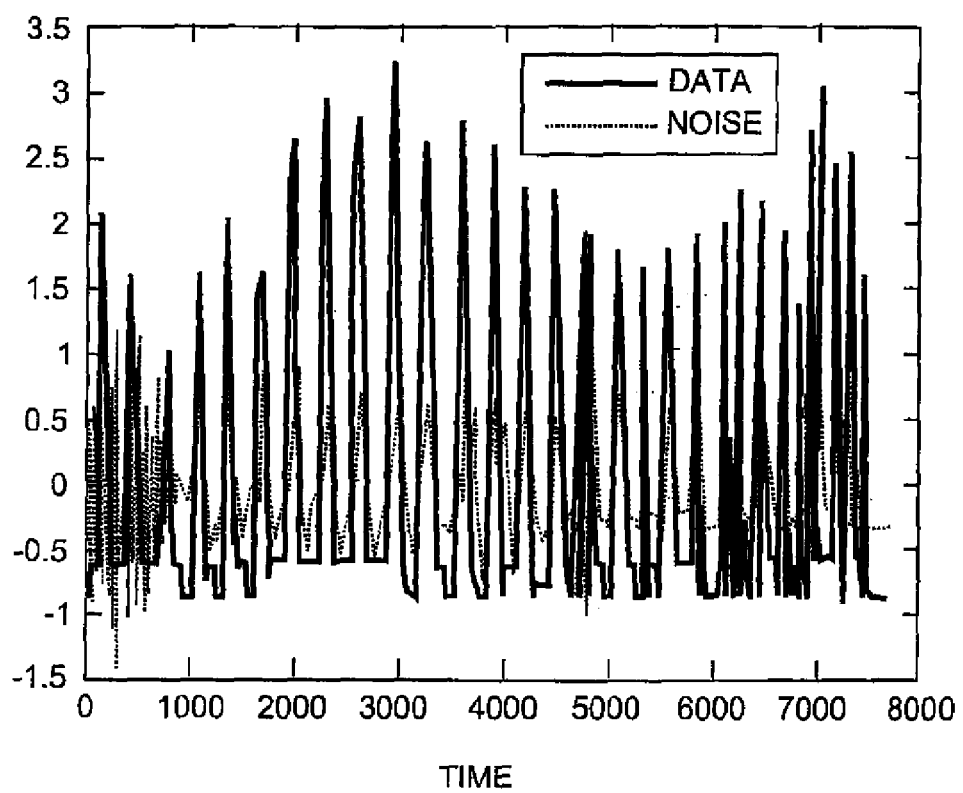
FIG. 8 is a graph illustrating autocorrelated noise added to data in a single data stream according to an embodiment of the present invention.
Figures 9, 10:
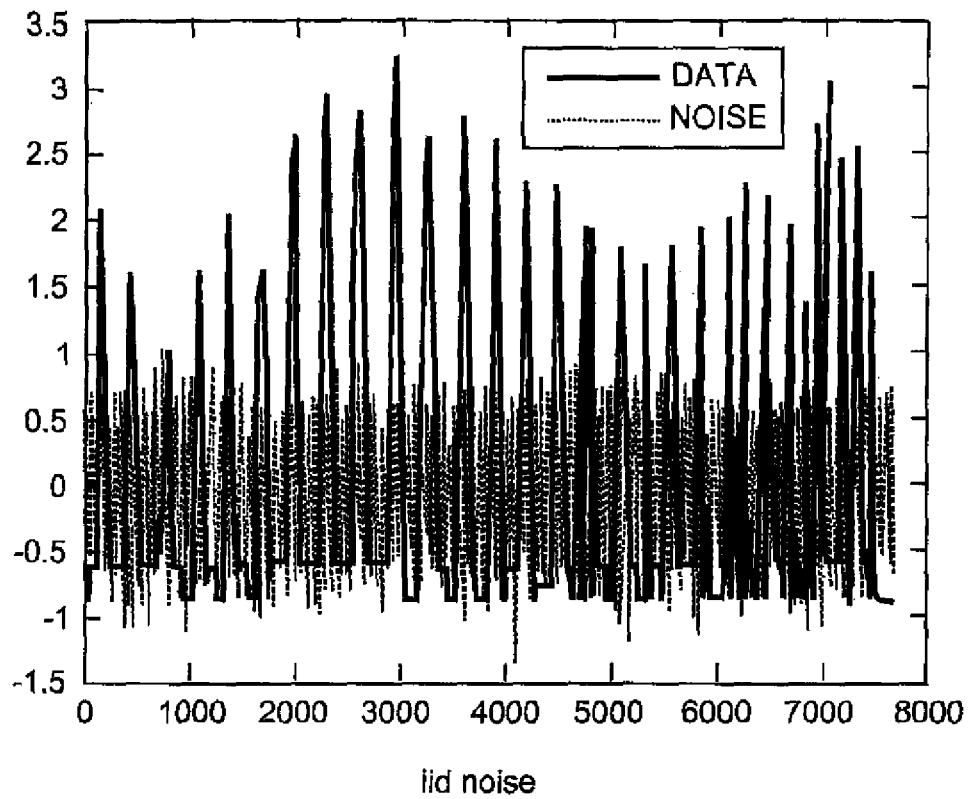
FIG. 9 is a graph illustrating random noise added to the data of the single data stream in FIG. 8.
FIG. 10 is a mathematical depiction of streaming autocorrelated additive noise according to one embodiment of the present invention.

For example, the light and dark curves in FIG. 8 are the autocorrelated noise and the original stream, respectively, where the noise follows the same trends as the streams, over time. In comparison, FIG. 9 shows i.i.d. noise, which can be easily filtered out. The goal is to find a principled way to automatically determine what is the "right" noise, which is "most similar" to the stream.

The discussion above showed how to track the local statistical properties of the N-dimensional sequence of the vectors $A_t$, indexed over time t. More specifically, the principal subspace of this matrix is tracked, thereby focusing on the most dominant (in a least-squares sense) of these relationships.

Noise that "mirrors" those relationships is subsequently added, making it indistinguishable from the original data.

The following discussion shows that the same principles used to capture relationships across many attributes can be used to capture relationships of one attribute across time. In fact, there is a natural way to move between the original time domain and a high-dimensional sequence space. The t-th window of the time series stream a(t) is an h-dimensional point, $W_t = [a(t), a(t+1), \ldots, a(t+h-1)]^T \in R^h$. The window matrix W has the windows $W_t$ as rows. Thus, $W_i^j = a((i-1)h+j)$ by construction. The space spanned by the sequence of windows $W_t$ is known as the h-th order phase space of the series a(t) M. GGhil, M. Allen, M. Dettinger, K. Ide, D. Kondrashov, M. Mann, A. Robertson, A. Saunders, Y. Tian, F. Varadi, and P. Yiou. Advanced spectral methods for climatic time series. *Rev. Geophys.*, 40(1), 2002. Subsequently, the same technique as before can be applied using W in place of A. The discussion above discussion with respect to the dynamic correlation method can be directly transferred to the autocorrelation case.

An example is shown in FIG. 10, however additional properties are discussed. Notice that the window matrix W is a Hankel matrix, i.e., the anti-diagonals are constants: $W_i^j = W_{i-1}^{j-1}$. Under the assumption that the series is stationary, the auto covariance matrix $W^T W$ is, in expectation is circulant, i.e., it is symmetric with constant diagonals. Additionally, if we perform a batch Eigen-analysis on the global window matrix of a static series, the sample auto covariance matrix computed from the actual data (i.e., $W^T W$ above) is also circulant. In this case, the eigenvectors of $W^T W$ essentially provide the same information as the Fourier coefficients of the series $W^T W$. In that sense, a traditional Fourier analysis is used. If these assumptions do not hold, the technique employed by the present invention is more robust and effective.

The following discussion address the issues that arise from the fact that W is a Hankel matrix. Similarly, the noise matrix E, in one embodiment, is a Hankel matrix as shown in FIG. 10. Similar to the correspondence between a and W, the noise matrix E has a corresponding noise sequence e, such that $E_t = [e(t), e(t+1), \ldots, e(t+h-1)]^T \in R^h$. $E_t$ has to lie in the subspace of U.

Formally stated, the residual $E_t - UU^T E_t$ must be zero, or $(I-UU^T)E_t = QE_t = (1)$ where $P = UU^T$ is the projection operator onto the subspace of U and $Q = I - P = I - UU^T$ is the projector onto the orthogonal complement. Assume that the noise values up to time t-k have been chosen. Based on these and on the current estimate of U, the next k noise values (where k is the principal subspace dimension) is determined. Let $$E_{t-h+1} \equiv [e(t-h+1), \ldots, e(t-k)|e(t-k+1), \ldots, e(t)]^T$$

where | denotes element wise $$\equiv [e_l^T | e_r^T]^T$$

concatenation (for example, [1,2|3,4] results into two row vectors [12] and [34]. The first block $e_l \in R^{h-k}$ comprises of h-k known values, whereas the second block $e_r \in R^k$ comprises of k unknown noise values that are to be determined. Similarly, decomposing $Q = [Q_l | Q_r]$ into blocks $Q_l \in R^{h \times (h-k)}$ and $Q_r \in R^{h \times k}$ equation (1) can be rewritten as $Q_l e_l + Q_r e_r = 0$ or $Q_r e_r = -Q_l e_l$ (2). This is a linear equation system with k variables and k unknowns. Since the principal subspace has dimension k by construction, the linear system is full-rank and can always be solved. The bottom right of FIG. 10 highlights the known $e_l$ and unknown $e_r$ (with one principle component k=1).

In one embodiment, the above equation cannot be applied for initial values of the noise; i.i.d. noise is used for those. Initially, nothing is known about the patterns present in the signal, therefore i.i.d. noise is the best choice, since there are no correlations yet. However, the entity trying to obtain the original data form the perturbed data also has not observed any correlations that can be leveraged to remove that noise. The important point is that, as soon as correlations become present, the privacy preserving module 220 learns them and uses them to intelligently add the noise, before the entity can exploit this information.

FIG. 8 clearly shows that the presently invention accurately tracks the dominant local trends, over a wide range of stream characteristics. The algorithm for reconstructing the original data is simpler, each window $W_t$ only needs to be projected onto the current estimate of U, exactly was done for the dynamic correlation case above.

The perturbed stream from SACAN satisfies $D(A, A^*) = \sigma^2$ and preserves the eigenvectors of the auto covariance matrix. The squared reconstruction error of SACOR on this perturbed stream is approximately $\sigma^2$. Preserving the autocorrelation properties, in addition to the privacy, is desirable, since several fundamental mining operations, such as autoregressive modeling and forecasting as well as periodicity detection P. J. Brockwell and R. A. Davis. *Introduction to Time Series and Forecasting.* Springer, 2nd edition, 2003., rely on them.

If both correlations are desired to be captured as well as autocorrelations on multi-dimensional streams, the problem can be decomposed in a fashion very similar to S. Papadimitriou, J. Sun, and C. Faloutsos. Streaming pattern discovery in multiple time-series. In *VLDB*, 2005. In this case, the present invention tracks the Eigen space of the covariance matrix. However, instead of using it only for adding noise, PCA is performed on the stream collection, to obtain k<<N streams of "hidden variables". Subsequently, the autocorrelation tracking scheme discussed above can be applied independently on each of these uncorrelated (across dimension) streams. SPIRIT performs precisely the same decomposition of the problem (while controlling the PCA approximation error) S. Papadimitriou, J. Sun, and C. Faloutsos. Streaming pattern discovery in multiple time-series. In *VLDB*, 2005., except it does so for multi-dimensional auto regression, rather than autocorrelation tracking.

As can be seen from the above discussion, data streams in the real world typically exhibit both significant correlations as well as autocorrelation, thereby providing ample opportunities for entities to breach privacy. The present invention provides a method for maintaining the privacy of numerical streams. In particular, the present invention provides privacy using correlation across multiple streams and of autocorrelation within one stream. The present invention dynamically tracks both and subsequently added noise that "mirrors" these statistical properties, making it indistinguishable from the original data. Therefore, the present invention prevent entities from leveraging these properties to remove the noise and thereby breach privacy.]

Exemplary Information Processing System

Figure 11:
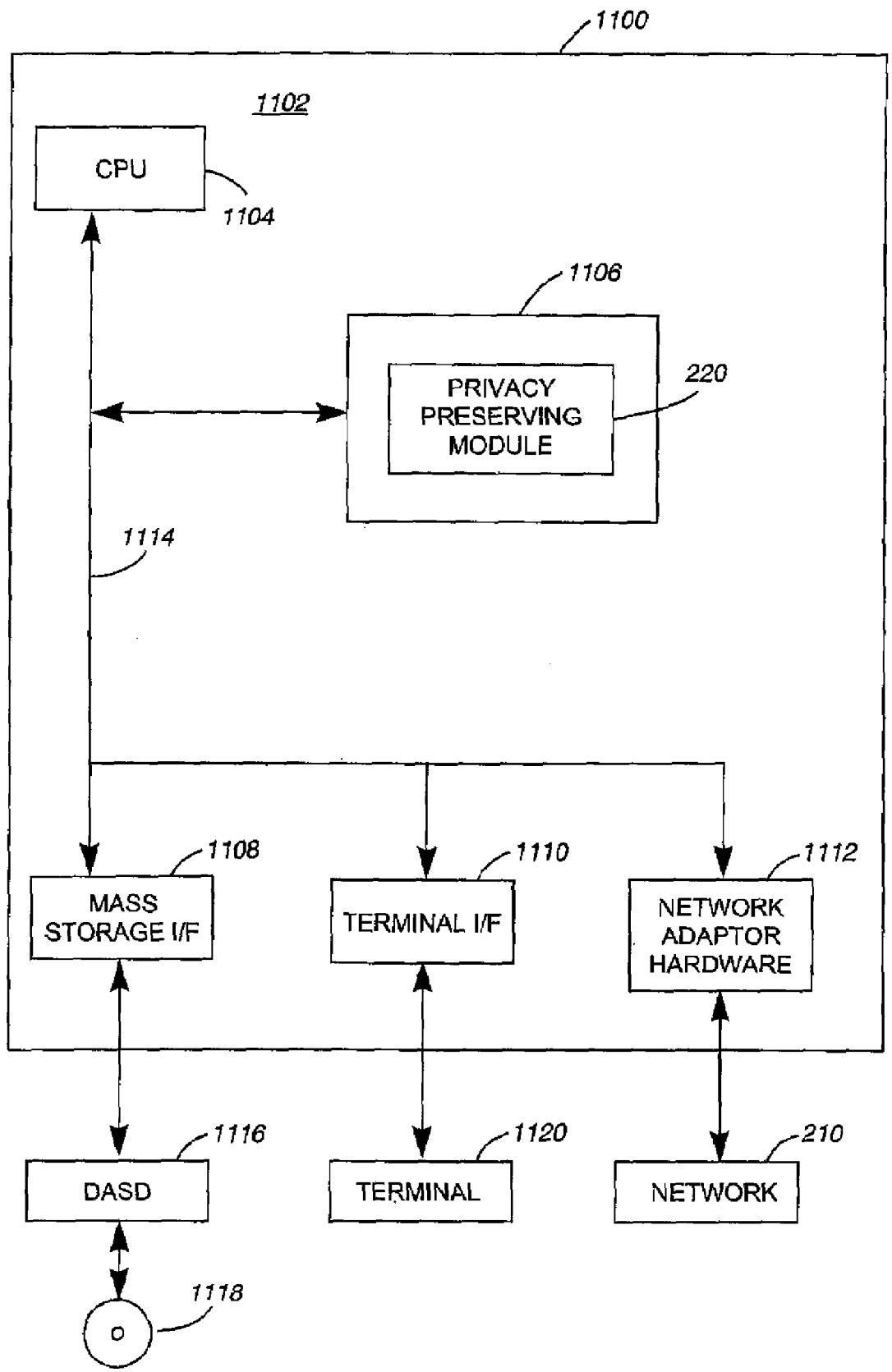
FIG. 11 is a detail view of an information processing system according to an embodiment of the present invention.

FIG. 11 is a block diagram illustrating a more detailed view of an information processing system 1100 such as the stream processing system 208. It should be noted that the following discussion is also applicable to an information processing system communicatively coupled to the stream processing system 208. The information processing system 1100 is based upon a suitably configured processing system adapted to implement the exemplary embodiment of the present invention. Any suitably configured processing system is similarly able to be used as the information processing system 1100 by embodiments of the present invention, for example, a personal computer, workstation, or the like. The information processing system 1100 includes a computer 1102. The computer 1102 has a processor 1104 that is connected to a main memory 1106, mass storage interface 1108, terminal interface 1110, and network adapter hardware 1112. A system bus 1114 interconnects these system components.

The mass storage interface 1108 is used to connect mass storage devices, such as data storage device 1116, to the information processing system 1100. One specific type of data storage device is a computer readable medium such as a floppy disk drive, which may be used to store data to and read data from a CD 1118 or a floppy diskette (not shown). Another type of data storage device is a data storage device configured to support, for example, NTFS type file system operations.

The main memory 1106 comprises the privacy preserving module 220, which has been discussed above in greater detail. Although illustrated as concurrently resident in the main memory 1106, it is clear that respective component(s) of the main memory 1106 are not required to be completely resident in the main memory 1106 at all times or even at the same time. In one embodiment, the information processing system 1100 utilizes conventional virtual addressing mechanisms to allow programs to behave as if they have access to a large, single storage entity, referred to herein as a computer system memory, instead of access to multiple, smaller storage entities such as the main memory 1106 and data storage device 1116. Note that the term "computer system memory" is used herein to generically refer to the entire virtual memory of the information processing system 1100.

Although only one CPU 1104 is illustrated for computer 1102, computer systems with multiple CPUs can be used equally effectively. Embodiments of the present invention further incorporate interfaces that each includes separate, fully programmed microprocessors that are used to off-load processing from the CPU 1104. Terminal interface 1110 is used to directly connect one or more terminals 1120 to computer 1102 to provide a user interface to the computer 1102. These terminals 1120, which are able to be non-intelligent or fully programmable workstations, are used to allow system administrators and users to communicate with the information processing system 1100. The terminal 1120 is also able to consist of user interface and peripheral devices that are connected to computer 1102 and controlled by terminal interface hardware included in the terminal I/F 1110 that includes video adapters and interfaces for keyboards, pointing devices, and the like.

An operating system (not shown) included in the main memory is a suitable multitasking operating system such as the Linux, UNIX, Windows XP, and Windows Server 2001 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1100. The network adapter hardware 1112 is used to provide an interface to the network 210. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 1118, CD ROM, or other form of recordable media, or via any type of electronic transmission mechanism.

Process of Preserving Privacy in Data Streams Using Dynamic Correlation

Figure 12:
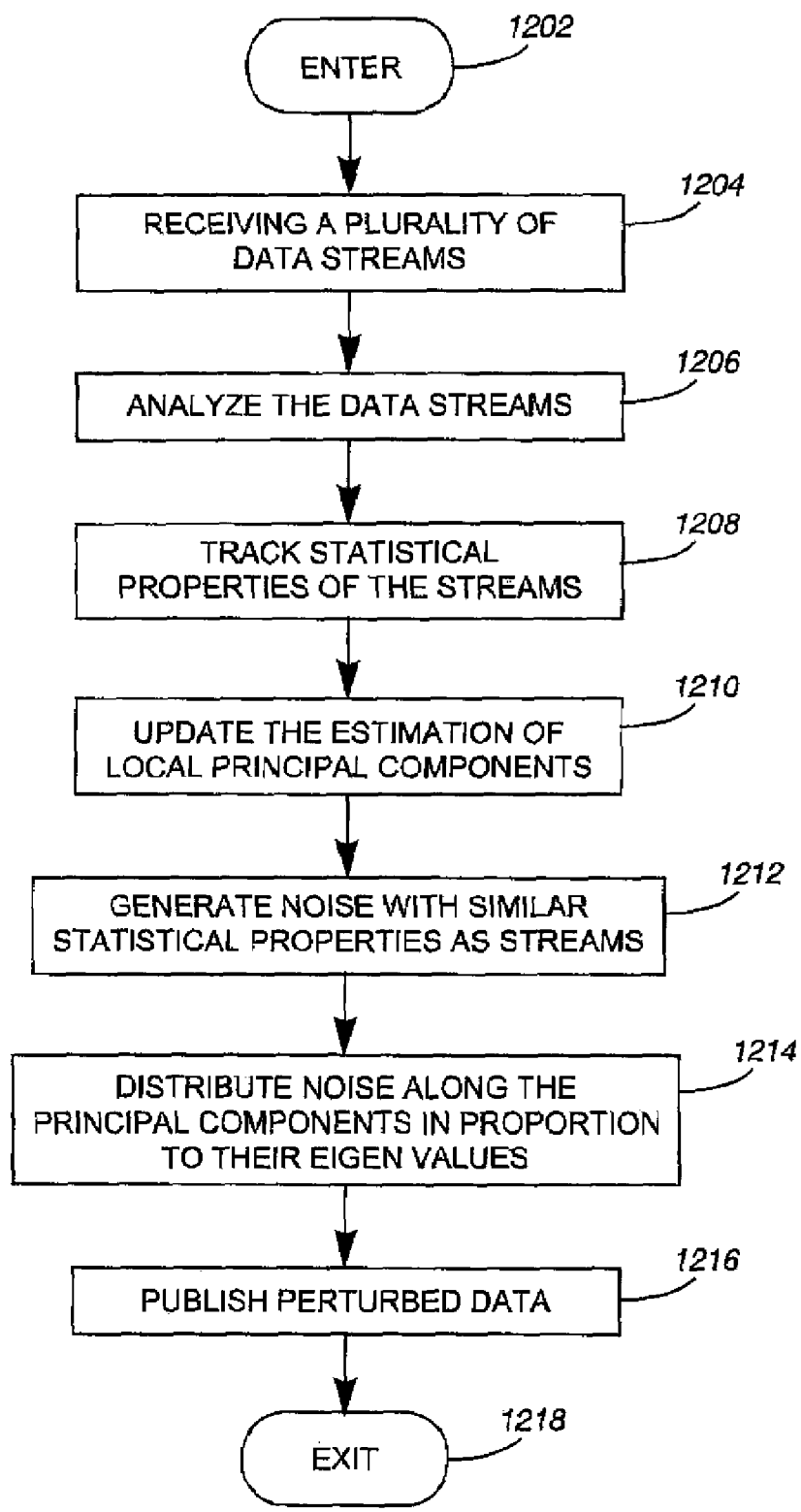
FIG. 12 is an operational flow diagram illustrating a process of using dynamic correlation to provide privacy in a plurality of data streams according to an embodiment of the present invention.

FIG. 12 shows a process of preserving privacy in a plurality of data streams using dynamic correlation. The operational flow diagram of FIG. 12 begins at step 1202 and flows directly to step 1204. The privacy preserving module 220, at step 1204, receives a plurality of nonstationary data streams. The privacy preserving module 220, at step 1206, analyzes the data streams. A set of first-moment statistical values for the data, at step 1208, is calculated. In one embodiment, the set of first-moment statistical values for the data include a principal component for the sub-space of time. The data, at step 1210, is perturbed with noise along the principal component in proportion to the first-moment of statistical values. The perturbing is performed in such a way so that at least part of a set of second-moment statistical values for the data is perturbed by the noise only within a predetermined variance. The control flow then exits at step 1212.

Figure 13:
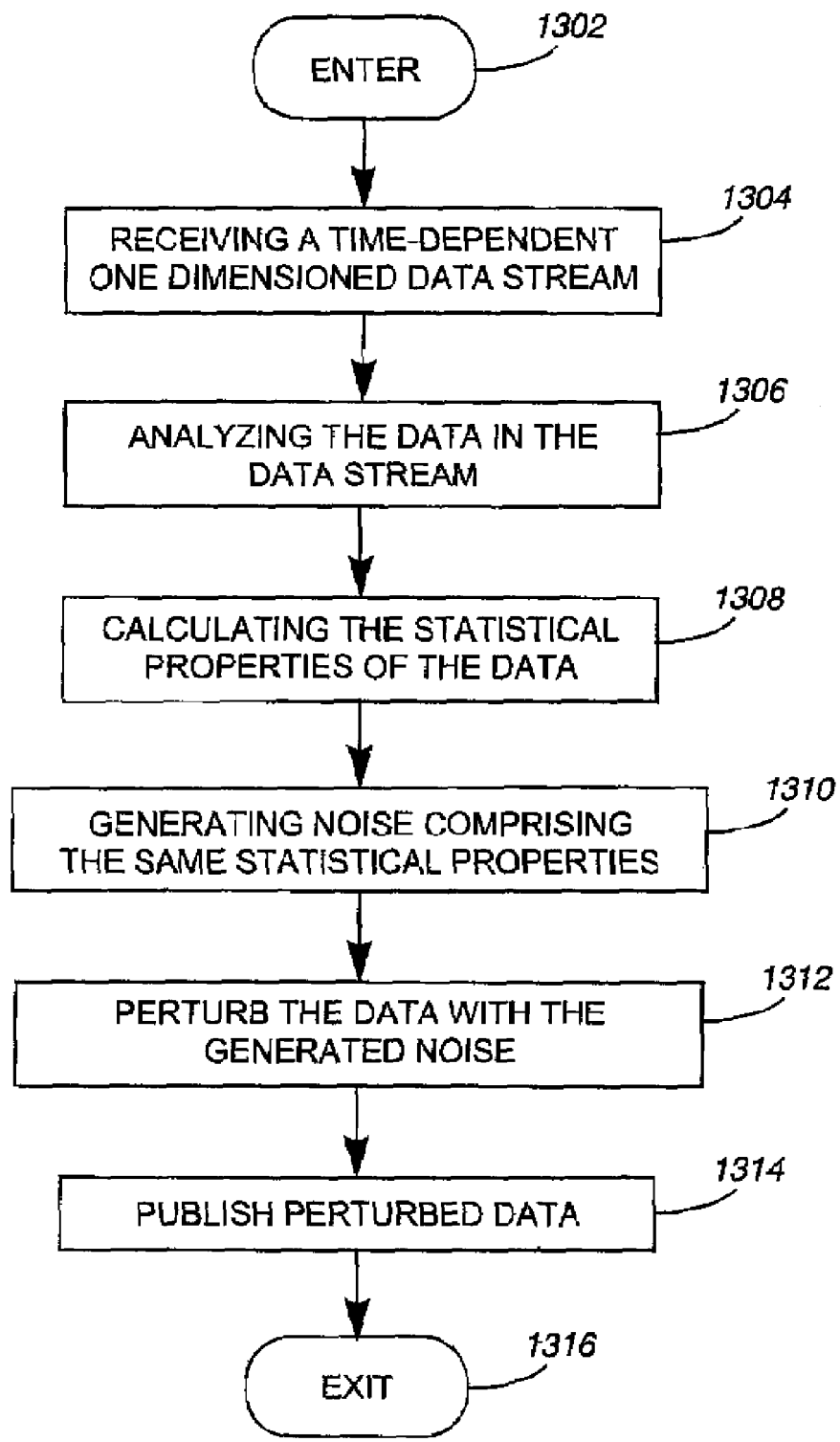
FIG. 13 is an operational flow diagram illustrating a process of using dynamic autocorrelation for providing privacy in a single data streams according to an embodiment of the present invention.

Process of Preserving Privacy in a Single Data Stream Using Dynamic Autocorrelation FIG. 13 shows a process of preserving privacy in a single data stream using dynamic autocorrelation. The operational flow diagram of FIG. 13 begins at step 1302 and flows directly to step 1304. The privacy preserving module 220, at step 1304, receives a one-dimensional nonstationary data stream. The privacy preserving module 220, at step 1306, analyzes the one-dimensional nonstationary data stream. A set of first-moment statistical values for the data, at step 1308, is calculated. In one embodiment, the set of first-moment statistical values for the data include a principal component for the sub-space of time. The data, at step 1310, is perturbed with noise along the principal component in proportion to the first-moment of statistical values. The perturbing is performed in such a way so that at least part of a set of second-moment statistical values for the data is perturbed by the noise only within a predetermined variance.

For example, if the stream always has a constant value, the right this value is hiding be adding the same noise throughout time. Any other noise can be easily filtered out by simple averaging. The situation is similar for a linear trend. If the stream is a sine wave, the wave can be hidden by adding noise with the same frequency (but potentially a different phase); anything else can be filtered out. The control flow exits at step 1312.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer implemented method for preserving privacy of one-dimensional nonstationary data streams, the computer implemented method comprising:
    a computer processor configured to perform
    receiving a one-dimensional nonstationary data stream comprising time dependent data from a one-dimensional domain;
    calculating, for a given instant of sub-space of time, a set of first-moment statistical values for the time series data wherein the first moment statistical values include a principal component for the sub-space of time; and
    perturbing the data with noise along the principal component in proportion to the first-moment of statistical values so that at least part of a set of second-moment statistical values for the time series data is perturbed by the noise only within a predetermined variance, wherein an output data stream generated based on the perturbing comprises a one-to-one correspondence to the one-dimensional nonstationary data stream that was received.

2. The computer implemented method of claim 1, wherein the set of first-moment statistical values include linear autocorrelation.

3. The computer implemented method of claim 1, wherein the set of first-moment statistical values include eigenvalues of the time dependent data and wherein the predetermined variance is proportional to the eigenvalues.

4. The computer implemented method of claim 1, wherein the calculating and perturbing is performed continuously over a time interval at a given sample rate of the data.

5. The computer implemented method of claim 1, wherein the perturbing the data with noise includes adding the noise along the principal component in proportion to the first-moment of statistical values.

6. The computer implemented method of claim 1, wherein the perturbing the data with noise includes noise which is random.

7. The computer implemented method of claim 1, wherein the perturbing the data with noise includes adding the noise with the data.

8. An information processing system for preserving privacy of one-dimensional nonstationary data streams, the information processing system comprising:
    a memory;
    a processor communicatively coupled to the memory; and
    a privacy preserving module communicatively coupled to the memory and the processor, the privacy preserving module adapted to:
    receiving a one-dimensional nonstationary data stream comprising time dependent data from a one-dimensional domain;
    calculating, for a given instant of sub-space of time, a set of first-moment statistical values for the data wherein the first moment statistical values include a principal component for the sub-space of time, wherein the set of first-moment statistical values include linear autocorrelation; and
    perturbing the data with noise along the principal component in proportion to the first-moment of statistical values so that at least part of a set of second-moment statistical values for the data is perturbed by the noise only within a predetermined variance.

9. The information processing system of claim 8, wherein the set of first-moment statistical values include eigenvalues of the time dependent data and wherein the predetermined variance is proportional to the eigenvalues.

10. The information processing system of claim 8, wherein the calculating and perturbing is performed continuously over a time interval at a given sample rate of the data.

11. The information processing system of claim 8, wherein the perturbing the data with noise includes adding the noise along the principal component in proportion to the first-moment of statistical values.

12. The information processing system of claim 8, wherein the perturbing the data with noise includes noise which is random.

13. The information processing system of claim 8, wherein the perturbing the data with noise includes adding the noise with the data.

14. A computer readable storage medium for preserving privacy of one-dimensional nonstationary data streams, the computer readable medium comprising instructions for:
    receiving a one-dimensional nonstationary data stream comprising time dependent data from a one-dimensional domain;
    calculating, for a given instant of sub-space of time, a set of first order statistical values for the time dependent data wherein the first order statistical values include a principal component for the sub-space of time; and
    perturbing the time dependent data with correlated noise, which has a substantially similar covariance as the one-dimensional nonstationary data stream, along the principal component in proportion to the first order of statistical values so that at least part of a set of second order statistical values for the time dependent data is perturbed by the noise only within a predetermined variance, wherein the correlated noise is dynamically inserted by first tracking an auto covariance matrix and then using the tracked auto covariance matrix.

15. The computer readable storage medium of claim 14, wherein the set of first-moment statistical values include linear auto-correlation.

16. The computer readable storage medium of claim 14, wherein the set of first order statistical values include eigenvalues of the time dependent data and wherein the predetermined variance is proportional to the eigenvalues.

17. The computer readable storage medium of claim 14, wherein the calculating and perturbing is performed continuously over a time interval at a given sample rate of the data.

18. The computer readable storage medium of claim 14, wherein the perturbing the data with noise includes adding the noise along the principal component in proportion to the first order of statistical values, and wherein the noise is random.

19. The computer storage readable medium of claim 14, wherein the perturbing the data with noise includes adding the noise with the data.

* * * * *